(12) United States Patent
Holdsworth et al.

(10) Patent No.: US 7,917,940 B2
(45) Date of Patent: Mar. 29, 2011

(54) INHERITANCE OF CONTROLS WITHIN A HIERARCHY OF DATA PROCESSING SYSTEM RESOURCES

(75) Inventors: Simon A J Holdsworth, Andover (GB); Neil G S Young, Southampton (GB)

(73) Assignee: International Business Machines Corporation, Armonk, NY (US)

(*) Notice: Subject to any disclaimer, the term of this patent is extended or adjusted under 35 U.S.C. 154(b) by 1774 days.

(21) Appl. No.: 10/319,199

(22) Filed: Dec. 13, 2002

(65) Prior Publication Data
US 2003/0188198 A1 Oct. 2, 2003

(30) Foreign Application Priority Data
Mar. 28, 2002 (GB) .................................. 0207354.2

(51) Int. Cl.
G06F 7/04 (2006.01)
H04L 9/32 (2006.01)
(52) U.S. Cl. ................... 726/2; 726/26; 713/170
(58) Field of Classification Search .................. 713/182, 713/170; 726/2, 16, 26
See application file for complete search history.

(56) References Cited

U.S. PATENT DOCUMENTS

| | | | | |
|---|---|---|---|---|
| 5,335,346 A | * | 8/1994 | Fabbio | 711/163 |
| 5,408,082 A | * | 4/1995 | Takagi et al. | 235/492 |
| 5,677,851 A | * | 10/1997 | Kingdon et al. | 709/229 |
| 5,701,458 A | * | 12/1997 | Bsaibes et al. | 707/9 |
| 5,715,403 A | * | 2/1998 | Stefik | 705/44 |
| 5,758,153 A | * | 5/1998 | Atsatt et al. | 1/1 |
| 5,761,669 A | * | 6/1998 | Montague et al. | 707/758 |
| 5,778,222 A | * | 7/1998 | Herrick et al. | 707/9 |
| 5,878,415 A | * | 3/1999 | Olds | 707/9 |
| 5,956,715 A | | 9/1999 | Glasser et al. | 707/9 |
| 5,999,978 A | * | 12/1999 | Angal et al. | 709/229 |
| 6,061,684 A | * | 5/2000 | Glasser et al. | 707/9 |
| 6,061,692 A | * | 5/2000 | Thomas et al. | 707/613 |
| 6,085,188 A | * | 7/2000 | Bachmann et al. | 707/3 |
| 6,141,754 A | * | 10/2000 | Choy | 726/1 |
| 6,158,007 A | * | 12/2000 | Moreh et al. | 726/1 |
| 6,308,173 B1 | * | 10/2001 | Glasser et al. | 707/9 |
| 6,438,549 B1 | * | 8/2002 | Aldred et al. | 707/9 |
| 6,490,619 B1 | * | 12/2002 | Byrne et al. | 709/223 |
| 6,643,682 B1 | * | 11/2003 | Todd et al. | 709/202 |
| 6,651,096 B1 | * | 11/2003 | Gai et al. | 709/223 |
| 6,704,873 B1 | * | 3/2004 | Underwood | 726/12 |
| 6,708,170 B1 | * | 3/2004 | Byrne et al. | 707/9 |
| 6,757,680 B1 | * | 6/2004 | Choy | 707/9 |
| 2002/0078004 A1 | * | 6/2002 | Ambrosini et al. | 707/1 |
| 2002/0083059 A1 | * | 6/2002 | Hoffman et al. | 707/9 |
| 2002/0087557 A1 | * | 7/2002 | Wall et al. | 707/10 |
| 2003/0009550 A1 | * | 1/2003 | Taylor et al. | 709/224 |
| 2003/0110246 A1 | * | 6/2003 | Byrne et al. | 709/223 |
| 2003/0188198 A1 | * | 10/2003 | Holdsworth et al. | 713/201 |

* cited by examiner

Primary Examiner — Techane J Gergiso
(74) Attorney, Agent, or Firm — Law Office of Jim Boice

(57) ABSTRACT

Provided are methods, apparatus and computer programs for applying access controls to control operations on hierarchically organized data processing system resources. A number of different scopes of applicability can be set in association with an access control, such as an ACL, and this will determine the inheritability, non-inheritability or limited inheritability of the access control for resources in the hierarchy. When a request is received to perform an operation, the access controls for the relevant branch of the hierarchy are processed to determine an applicable access control—taking account of inheritance attributes which have been set for individual access controls. The invention is useful for controlling the application of ACLs to topics in a topic tree within a publish/subscribe message broker.

9 Claims, 7 Drawing Sheets

US 7,917,940 B2

INHERITANCE OF CONTROLS WITHIN A HIERARCHY OF DATA PROCESSING SYSTEM RESOURCES

FIELD OF INVENTION

The present invention relates to methods and apparatus for setting and applying access controls in a data processing system. In particular, the invention relates to access controls for hierarchically organized data processing system resources.

BACKGROUND OF THE INVENTION

Some systems of access control, for example access control lists (ACLs) associated with a topic tree in a publish/subscribe system, allow for the creation of an access control mechanism which enables the policy at one node in the tree to be inherited by the descendant nodes. This avoids the need for explicit ACLs at every node of the tree.

For example, in a simple system where users have their access controlled for publish and/or subscribe operations, and the tree structure is built from the topic structure, each node has an associated list which contains (principal, access) pairs, where "principal" may be the user or group to whom the access control applies, and "access" describes the access control to be applied. In the publish/subscribe example, "access" includes a value for subscribe access and a value for publish access. These typically take one of the values "permit", "deny", or "inherit", where "inherit" indicates that the policy in force for a user or group is inherited from a parent node. The absence of an explicit access control list entry for a principal is equivalent to all values set to "inherit". Therefore, the inheritance model is for all descendants without an explicit access control list entry to inherit their access controls from the closest ancestor node which has a directly associated access control list. This is known as the sparse ACL model.

Systems implementing this inheritance model allow generalization of access control by allowing general, high-level rules to be set at a high level in the hierarchy, while allowing less general rules to be applied to sub-trees or leaf nodes within the hierarchy.

There are, however, some problems with this approach which are related to the following characteristics of the model:
1) The controls take effect at the node on which they are defined.
2) The controls always affect all descendant nodes which do not have overriding controls.

The limitation with 1) is that in a broad tree where nodes have many children, either the access control must be set on the parent of the children—allowing users access to the parent node—or access control must be set individually on each child.

The limitation with 2) is that in a tall tree, where it is only desirable for certain principals to use intermediate nodes, but where general rules apply to the leaf nodes, controls must be applied individually at the leaf nodes.

Despite these problems, the sparse ACL inheritance model described above has been widely used. U.S. Pat. No. 5,956,715 (and related U.S. Pat. Nos. 6,061,684 and 6,308,173) discloses inheritance of a node's ACLs by all descendants of that node, with each node automatically inheriting from the nearest ancestor which has a defined ACL. A user may choose to change ACLs on descendant nodes when changing ACLs on a parent, but the inheritance model remains the same—i.e. that all descendant nodes which do not have their own explicit ACL inherit from the closest ancestor which does have an explicit ACL.

U.S. Pat. No. 5,778,222 discloses a method and system for managing access to objects within an hierarchical structure, and an API is provided for managing changes to ACLs. The API includes user-selectable options including: an "absolute" ACL change operation in which a changed ACL overrides and replaces all previous ACLs defined for descendant directories of the hierarchy; a "union" operation in which a new ACL is OR'd with descendant directories; a "non-intrusive" ACL change operation in which ACLs are not added to any parent or children directories where the parent already has an ACL defined; and a delete operation for removing ACLs. While this provides flexibility and assistance for ACL change management, the default inheritance model remains for each node of the hierarchy to inherit from the closest ancestor having an explicit ACL entry.

U.S. Pat. No. 6,158,007 discloses use of ACLs in a publish/subscribe messaging environment, and discloses child subjects of a subject tree structure inheriting their security policy (and hence the ACL) of a parent subject. A default security policy may be assigned to subjects which do not have an explicit security policy associated with them, and this will also be inherited by descendants in the absence of an explicit security policy.

U.S. Pat. No. 5,701,458 discloses a system and method for managing access control lists in a data processing system with an hierarchical object structure which permits manipulation of an arbitrary set of ACLs and individual entries within an ACL. By permitting operation on the arbitrary set of ACLs rather than a resource tree, heterogeneous trees remain after the apply function. Nevertheless, the standard inheritance model, inheriting access controls from the nearest-ancestor having an explicit ACL, is implemented following the flexible manipulation.

U.S. Pat. No. 5,335,346 is another example patent which discloses objects inheriting access control policies from a parent objects, in the context of ACLs in an object oriented database.

SUMMARY OF INVENTION

According to a first aspect of the invention, there is provided a data processing apparatus including means for applying access controls to hierarchically organized data processing system resources, the means for applying access controls including: means for associating a scope of applicability with an access control for a first resource; and means for controlling the performance of an operation in accordance with the access control, wherein the means for controlling is responsive to a first scope of applicability associated with an access control to limit access control inheritability to less than all descendants of the first resource in the hierarchy.

Preferably, the means for controlling is also responsive to an alternative scope of applicability for an access control to enable access control inheritability by all resources which are descendants of the first resource in the hierarchy.

In a second aspect, there is provided a method for applying access controls to hierarchically organized data processing system resources, the method including: associating a scope of applicability with an access control for a first resource; and controlling the performance of an operation in accordance with the access control, wherein the step of controlling is responsive to a first scope of applicability for an access control to limit access control inheritability to less than all descendants of the first resource in the hierarchy. As noted above, it is preferred for the step of controlling to also be responsive to an alternative scope of applicability for an access control to provide inheritability of said access control by all resources which are descendants of the first resource in the hierarchy.

The method may be implemented in a computer program comprising program-code-implemented instructions for controlling the operation of a data processing system on which it executes to perform a method as described above. The program code may be made available as a program product in which machine-readable program code is recorded on a machine-readable recording medium.

The invention can be implemented to enhance the use of ACLs for controlling which users or groups are permitted to perform which operations on hierarchically organized resources, but the invention is applicable to other forms of authorization and permission-controlled operations within a data processing environment, and the term 'access control' should be interpreted accordingly.

The invention allows local access control overrides at nodes in the hierarchy, enabling a user to specify that particular access controls will apply to, for example, only a selected node or that only a selected set of descendant nodes will inherit from a selected starting node. This can avoid the need to set additional access controls further down the hierarchy, so that now an intermediate current node or set of nodes can have explicit access controls and yet descendants lower down in the hierarchy are able to inherit from an ancestor of the current intermediate node without being influenced by the access controls on the intermediate node.

This changes the known inheritance model, in which all descendants inherit the access controls specified for the closest ancestor which has such specified access controls, to enable users to specify a limited set of descendants or a limited depth of applicability of access control inheritance within the hierarchy (i.e. less than all descendants). The local override of access control may be applied to a single node, such that inheritance from a previous ancestor skips the current node but the ancestor's access controls remain applicable to the ancestor's descendants other than the current node. Alternatively, the local override may apply to a current node and its descendants to a specified depth in the hierarchy (e.g. a current node and its immediate descendants only; or a current node and all descendant nodes except leaf nodes).

In a preferred embodiment of the invention, the ability to specify access control for an individual node while leaving the access controls for all other nodes unchanged (including not changing access control for descendants, even where their access control policies rely on inheritance) is achieved by introducing an additional type of access control list at each node, called the "override" access control list. A conventional access control list will be referred to herein as a "conventionally inheritable" access control list.

According to this embodiment, when access control for a principal and operation is being determined, any override access control list entries for the specific node are examined. If this results in one of the values "allow" or "deny", then that is taken as the access control for the operation. If there are both user-specific and group access controls for the operation, the user-specific controls take priority. Otherwise the access control is calculated from conventionally inheritable access control lists.

This addition of a new type of ACL allows for the following two enhancements to known schemes, corresponding to the two problems described above:

1. A parent node with many children requiring common controls can have the controls for the children set at the parent node, with additional override controls on the parent node. This means that the children's common controls effectively only apply to the children and not to the parent.
2. In a tall tree, access controls can be set near the root of the tree, then intermediate levels can have override controls to deny access to them. Leaf and near-leaf nodes then inherit the general controls without allowing access to intermediate levels.

In other embodiments, instead of setting two sets of controls at the parent—one of which is inherited, and one of which is limited to the parent and overrides the inherited controls for only that parent node—a scope of applicability is selectable which controls the inheritability of access controls to descendants (either all, a limited subset, or an empty subset), preferably including the option to select a scope of applicability which excludes the parent node at which the control was set.

The invention is particularly useful when setting and evaluating operation permissions for principals (users or groups) for topic trees within a publish/subscribe communications environment. Thus, the invention may be implemented within a message broker for distributing messages to subscriber application programs in accordance with topic-based subscriptions.

Typically, existing hierarchical access control systems use only the conventionally-inheritable controls in which all descendants can inherit from the closest ancestor's ACL according to the sparse ACL model, or no inheritance is provided at all.

According to another aspect of the invention, there is provided a method, computer program and data processing apparatus for evaluating access controls associated with an hierarchically organized set of data processing system resources, for use in a system in which a scope of applicability can be selected for an access control. The method comprises: responsive to an operation request, traversing a branch of the hierarchy corresponding to the subset of the hierarchically organized resources which are relevant to a requested operation, to identify access controls associated with the subset; determining which of the identified access controls is applicable to the requested operation; and either performing the requested operation or declining the request in accordance with the determined applicable access controls; wherein the step of determining the applicable access controls comprises evaluating a scope of applicability attribute associated with at least one of the identified access controls to determine which data processing system resources inherit access controls from which other resources within the hierarchy.

For example, in response to selection of a first scope of applicability of an access control for a first resource, the access control is inheritable by all resources which are descendants of the first resource in the hierarchy whereas, in response to selection of an alternative scope of applicability of an access control for the first resource, access control inheritance is limited to a subset of said descendants of the first resource which is less than all descendants (and which may be an empty subset).

BRIEF DESCRIPTION OF DRAWINGS

Embodiments of the invention will now be described in more detail, by way of example, with reference to the accompanying drawings in which.

DETAILED DESCRIPTION OF PREFERRED EMBODIMENTS

Tree structures are commonly used to represent hierarchically organized data within a data processing system. Categories of data are represented in nodes of the tree structure. The tree structure starts with a root node which has a plurality of branches. Each branch can have lower branches ending in the lowest nodes which may be referred to as leaf nodes. In the hierarchical tree structure, nodes are referred to as parent and child nodes (or, more generally, ancestor and descendant nodes) to indicate their relationship within the tree structure.

Examples of resources that are stored in a tree structure include topics in a message broker for controlling the receipt and distribution of messages, entries in a lightweight directory access protocol (LDAP) repository or directories and files in a filing system such as the DCE Distributed File System. Resources are stored in tree structures in a wide range of applications.

Figure 1:
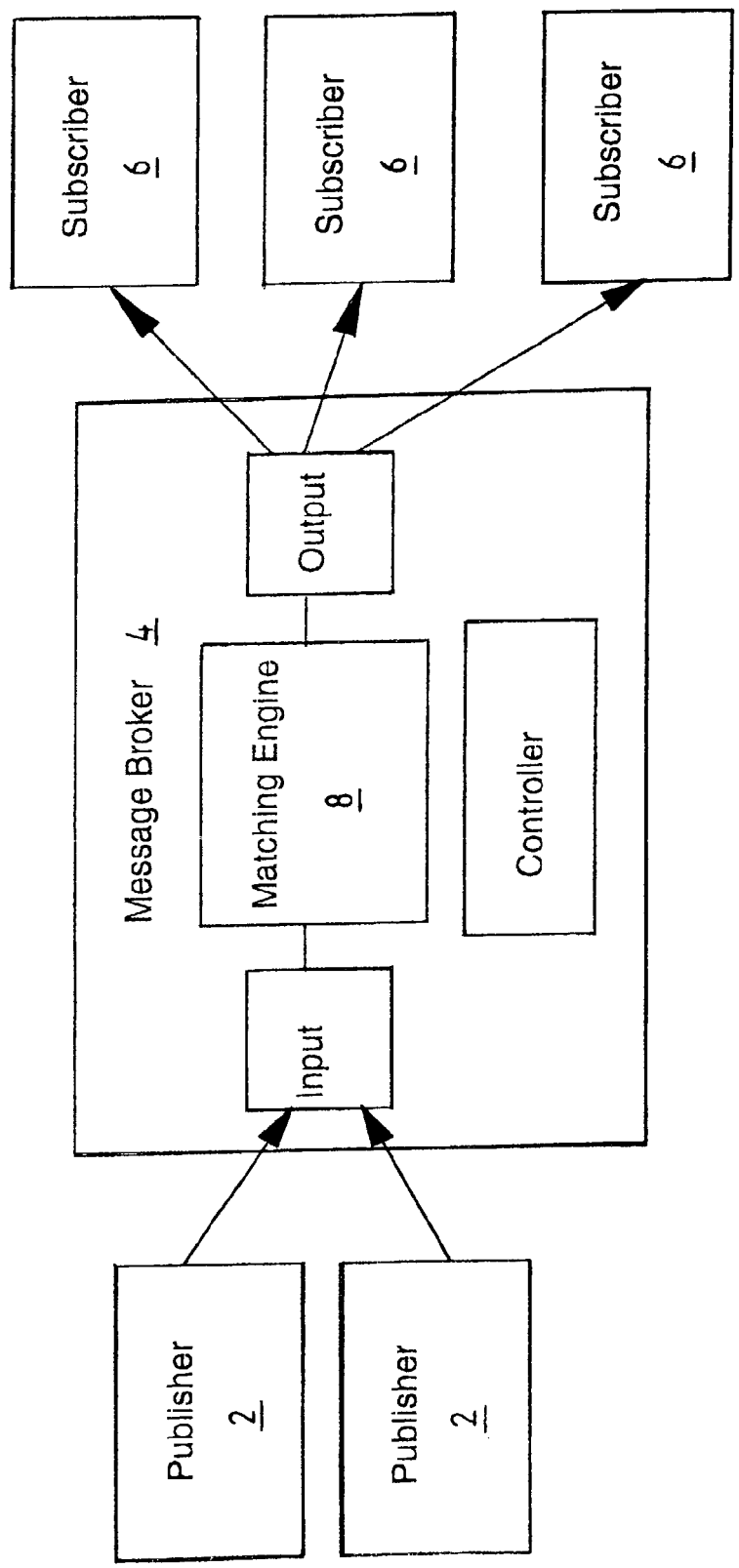
FIG. 1 is a schematic representation of a message broker, and publisher and subscriber application programs, in a publish/subscribe broker environment.

While the methods and apparatus described herein have wider applications, the embodiments which will now be described are applicable to a software-implemented message broker providing publish/subscribe services within a messaging network. A message broker 4 enabling integration between a set of publisher application programs 2 and subscriber application programs 6 is shown schematically in FIG. 1. Message topics can be organized in a tree structure within the broker. A suitable message broker for implementing the invention is IBM Corporation's WebSphere MQ Integrator product, which provides functions for message routing, transformations including filtering and augmenting of messages, and topic-based publish/subscribe capabilities for integration of application programs. IBM and WebSphere are trademarks of International Business Machines Corporation.

A topic specifies a subject of common interest to producers and consumers of messages (publishers and subscribers). Almost any string of characters can act as a topic to describe the topic category of a message.

Topics provide the key to the delivery of messages between publishers and subscribers. They provide an anonymous, scalable and easily maintained alternative to citing specific destination addresses. The broker 4 attempts to match a topic on a published message with a list of clients who have subscribed to that topic. A matching engine 8 is provided within the broker for this purpose. The matching engine creates a parsed representation of the topic strings included in any subscription requests it receives from application programs and adds this parsed representation to a tree structure which represents the hierarchy of message topics. This tree structure is stored within a 'match space' of the system memory under the control of the matching engine. The topic strings of incoming messages are subsequently parsed against this topic tree by the matching engine to identify which subscriber applications have registered to receive messages on this topic, thereby to provide publish/subscribe message distribution.

Figure 2:
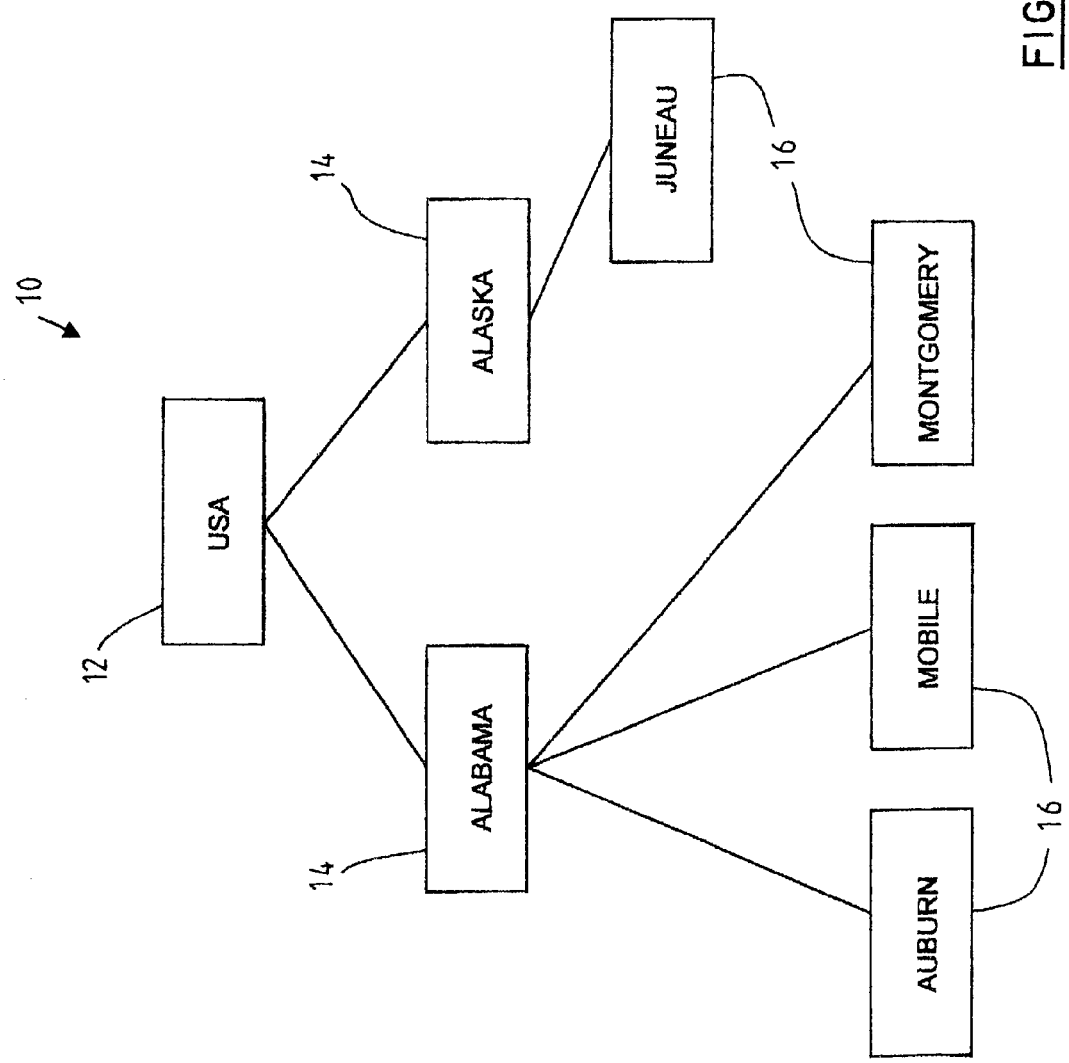
FIG. 2 is a representation of a topic tree structure.

The structure of the tree follows a format with levels of increasing granularity, for example, "country/state/city". FIG. 2 shows a tree structure 10. Each string in the topic name represents a node on the topic tree 10. Topic names fully specify the path to a specific node from the root of the tree in this format: "root/level2/level3".

In FIG. 2, for example, the string "USA" acts as a root node 12, the first level of a topic name for topics in this tree 10. The strings representing states "Alabama" and "Alaska" are nodes at a second level 14 of the tree 10. The strings representing cities "Juneau", "Auburn", "Mobile" and "Montgomery" are nodes at a third level 16 of the tree 10. Valid topics include "USA", "USA/Alabama" and "USA/Alabama/Montgomery".

Topic-specific access controls can be used to control which subscribers are authorized to receive certain publications, who can use the broker to publish on a particular topic, and which users or groups are entitled to request certain qualities of service.

Each topic in the tree may have an associated Access Control List (ACL) that determines who is able to publish or subscribe (or request specific quality of service for delivery of messages) on that topic. Since topics are organized in a tree structure, the hierarchy of relationships can be used to enable the Access Control List (ACL) of a parent topic to be inherited by its child topics—as is known in the art. Furthermore, it is known in the art that access control or authorisation policies may be defined for both individual users and for groups of users.

The ability of users to publish information, or subscribe to information depends on the setting of the Access Control Lists (ACLs). The ACLs are set on topics to which the message is published. Publishers must have permission specified in the ACL to publish to the required topic. Subscribers must have permission specified in the ACL to subscribe to the required topic. Subscribers may also request a particular quality of service (QoS) for message delivery, such as persistence. If the ACLs do not permit this QoS, the subscriber may still receive the desired messages but not with that QoS.

In the general case, the decision on whether a specific user may perform a specific operation on a specific topic requires a traversal from that topic to the root of the topic tree by a process that collects the set of ACL entries on the specific topic, intervening nodes and root node that relate to the user, either directly or through membership of groups. The set of user-related ACL entries is then processed to determine the prevailing policy which, in turn, determines whether the user can perform the requested operation. This processing is generally performed at run time, in response to receipt of a message, as part of the determination of who to route the message to.

An explicit ACL can be created for any topic in the topic tree, up to and including the root of the tree, and stored by the message broker in association with that topic. An ACL allows, denies, or inherits the authority to publish, to subscribe, and/or to request persistent message delivery. As is known in the art, if any topic does not have an explicit ACL, it is governed by the ACL it inherits from its higher level (ancestor) topic in the tree. The default ACL setting for the topic root is to allow public access. This can be modified to restrict access by introducing ACLs at specific points in the tree. This can mean that if a leaf topic does not explicitly state the ACL permissions then the ACL permissions are derived from the closest ancestor among the higher-level topics, ultimately using the root ACLs if no other ACLs have been found in the topic tree.

If there are no explicit user ACLs for the user on the topic of interest or its ancestors, the broker attempts to verify the current operation on the basis of group ACLs.

This is an implementation of the known sparse ACL model, which is widely used for reducing the number of explicit ACLs which must be set for controlling permission to perform operations on hierarchically organized resources. However, there are some problems with this known solution.

Firstly, a choice must be made between setting an access control on the parent of a set of children or setting the control individually for each child. The latter may be time consuming in a broad tree in which parents have many children (and any requirement to repeat a configuration operation several times increases the likelihood of human error), but the former will allow users access to the parent and this may be unacceptable.

Secondly, where it is only desirable for certain principals to have access to intermediate nodes, but where more general access is required for the root nodes and leaf nodes, the sparse ACL model requires controls to be applied at the root node, and at the intermediate nodes, and at the leaf nodes—i.e. at each level in the hierarchy at which the applicable access controls change. This has the consequences of undesirable repetition and scope for errors, and any unnecessary complexity increases the maintenance effort for system administrators.

An access control solution will now be described which mitigates these problems—helping with the setting of access controls and ongoing maintenance of operation permissions for hierarchically organised resources. The solution can also be used to provide improved processing of access controls to determine whether a requested operation is permitted.

As described earlier, a message brokering system controls the delivery of messages between publishers and subscribers of messages. The messages can be published and delivered according to topics of the messages. The topics are arranged in a topic tree structure within a match space of memory which is managed by the message broker's matching engine. Principals are defined as individual users or groups of users of the message broking system who publish and subscribe individually or in groups to the messages handled by the system. All defined principals can be associated with any topic. The permissions that can be set are shown below.

| Option | Description |
| --- | --- |
| Publish | Permits or denies the principal to publish messages on this topic. |
| Subscribe | Permits or denies the principal to subscribe to messages on this topic. |
| Persistent | Specifies whether the principal can receive messages persistently. If the principal is not permitted, all messages are sent non-persistently. Each individual subscription indicates whether the subscriber requires persistent messages. |

Persistent access control behaviour is not identical to the publish and subscribe control. Clients that are denied Publish access have their publication messages refused. Clients that are denied Subscribe access do not receive the publication. If persistent access is denied the system does not deny the message to subscribers, but does deny them persistence. Persistent denied subscribers receive messages (subject to their subscribe access control), but have the message sent to them non-persistently, regardless of the persistence of the original message.

Each topic in the tree may have an associated Access Control List (ACL) that determines which principals are able to publish, subscribe or request persistent delivery of messages on that topic. In general, the Access Control Lists (ACLs) of a parent topic can be inherited by its descendent topics that do not have an explicit ACL as in the sparse ACL model. Therefore, it is not necessary to have an explicit ACL associated with each and every topic. Every topic has an ACL policy, which is either that of its parent or has been explicitly associated with the current topic. If all parent topics up to the root topic do not have explicit ACLS, that topic inherits the ACL of the root topic.

Figure 3:
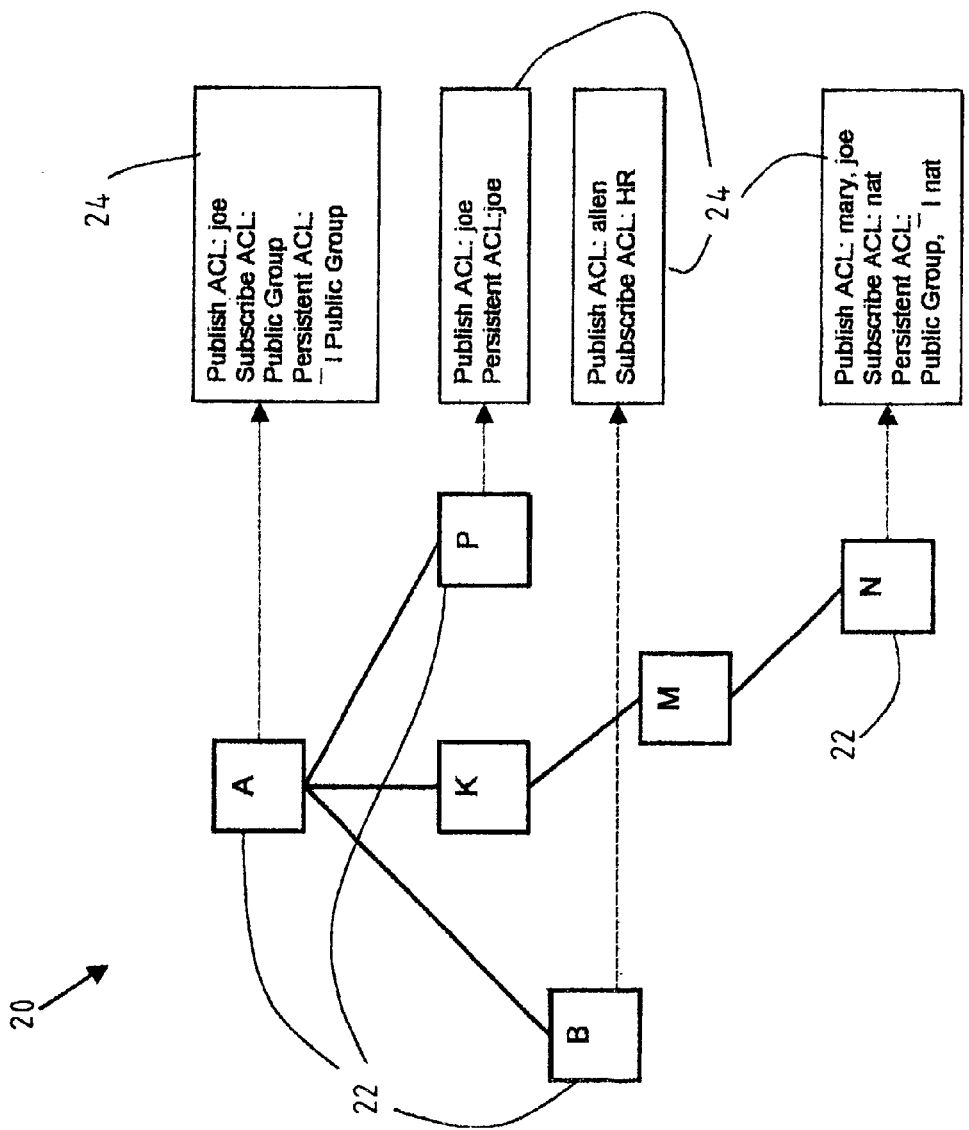
FIG. 3 is a representation of a topic tree showing Access Control Lists in a message broking system at selected nodes of the tree structure.

For example, a topic tree 20 is illustrated in FIG. 3. The topic root is not shown but is assumed to have an ACL for Public Group access that allows permission to publish, subscribe, and receive persistent publications. The ACL permissions 24 are shown for selected topic nodes 22 in the tree 20. The table below summarizes the ACLs for each topic node 22 in the tree 20 shown.

| TOPIC | PUB-LISHERS | SUB-SCRIBERS | PER-SISTENCE | COMMENTS |
| --- | --- | --- | --- | --- |
| A | only joe | everyone | no-one | Explicit policy |
| A/P | only joe | everyone | only joe | Explicit policy, but inheritance for subscribe ACL |
| A/K | only joe | everyone | no-one | Policy through A |
| A/K/M | only joe | everyone | no-one | Policy through A/K |
| A/K/M/N | only mary, joe | everyone | everyone except nat | Explicit policy |
| A/B | allen | HR | no-one | Persistent inherited through A |

As described so far, this solution is consistent with known solutions in which ACLs are inheritable in the conventional way. However, to mitigate the above-described problems of the sparse ACL model, a new type of ACL has been defined to enhance the use of ACLs for hierarchically organized resources. This will be referred to as an "override ACL". It is likely that the most prevalent use of non-inheritable ACLs will be for groups, but non-inheritable ACLs can be applied for individual users as well. They are useful wherever in a topic tree an intermediate node requires a permission for a principal which differs from a permission for that principal which is commonly applied to one or more ancestors and one or more descendants of that node; and also wherever in a topic tree a set of descendant nodes require a common permission for a principal that differs from the permission for that principal on the parent node.

In a first embodiment, an override ACL has an attribute or flag which identifies it as non-inheritable by any descendant nodes. Override ACLs are generated for a resource in the same way as conventionally-inheritable ACLs, but they are logically applied to the hierarchical resource structure subsequent to applying inheritable ACLs. The default inheritance of an ACL from a parent to all children which do not have explicit ACLs of their own is overridden by setting the "non-inheritable" flag—with the result that non-inheritable ACLs apply to only a specific individual resource (e.g. a topic within a topic tree).

When determining applicability of an ACL (either as a test or in response to a request to perform an operation which is controlled by ACLs), a set of conventionally-inheritable ACLs relevant to the current node's branch of the hierarchy may be identified and processed as described above. This involves stepping through the nodes of the relevant branch of the topic tree; collecting the set of ACLs for that set of nodes; and processing the set of ACLs to determine the applicable ACL for a topic of interest. As described above, access control can be set explicitly on an individual topic, but can be inherited if there is no explicit ACL in place. Inheritance is from an ancestor (parent) topic, defined by the hierarchical structure of the topic tree. If none of the parent topics up to the topic root has an explicit ACL, the individual topic inherits the ACL of the topic root.

However, according to this first embodiment of the present invention, access control is further refined through the use of non-inherited or "local override" ACLs which are associated with a topic and a user or group. These apply to a specific topic only, they are not inherited by descendant topics, and they override other ACL calculations for that specific topic. The processing of the set of accumulated ACLs involves processing a set of rules to determine which ACL is applicable to a topic of interest and to take account of the prioritization of potentially conflicting ACLs, as will be described below.

As well as allowing a smaller number of ACLs to be set in total, the addition of non-inheritable ACLs has the advantage of enabling an inheritable ACL to be specified on a parent node to control access to all descendants, and then a non-inheritable ACL can be specified for the same node to override the access control for just that parent node.

If the principals in a broker domain include one or more users in more than one group, it is possible for the explicit and/or inherited ACL values to conflict, so a set of rules is required to determine which ACL prevails. These rules are as follows:

If the user has an explicit user ACL on the topic of interest, this takes priority and the broker verifies the current operation on that basis. If there is both an explicit inheritable ACL and an explicit non-inheritable ACL for the topic, the non-inheritable ACL takes priority for that topic (but the inheritable ACL may control operations on descendant topics).

If the user does not have an explicit user ACL on the topic of interest, but has explicit inheritable user ACLs against an ancestor in the topic tree, the closest inheritable ancestor ACL for that user takes priority and the broker verifies the current operation on that basis.

If there are no explicit user ACLs for the user on the topic of interest or its ancestors, the broker attempts to verify the current operation on the basis of group ACLs:

1. If the user is a member of a group that has an explicit group ACL on the topic of interest, the broker will verify the current operation on the basis of that group ACL.
2. If the user ID is contained in more than one group with an explicit ACL on the topic of interest, then non-inherited ACLs prevail over inheritable ACLs. Further, if the user ID is contained in more than one group with explicit ACLs of a particular kind, then permission is granted if any of the specifications are positive, otherwise it is denied.
3. If the user is not a member of a group that has an explicit group ACL on the topic of interest, but is a member of a group with explicit group ACLs against an ancestor in the topic tree, the closest inheritable ancestor ACL takes priority and the broker verifies the current operation on that basis.
4. If, at a particular level in the topic tree, the user ID is contained in more than one group with an explicit inheritable ACL, permission is granted if any of the specifications are positive, otherwise it is denied.

Message brokers are already known to provide a rules processing capability, and for applying a set of rules to determine priorities between ACLs applied to a topic tree, and so the set of rules described above for determining priority of ACLs can be easily integrated within the existing architecture of a rules-processing message broker system.

In the following example, topics are hierarchically organized starting from a root node ("stock"), with intermediate nodes (for example "NYSE" and "FTSE") and leaf nodes ("IBM", "Microsoft", "HFX", etc). ACLs can be defined at each node in the tree, including non-inheritable "override" ACLs which are applied after all other ACL calculations have been done. These override ACLs are not used for inheritance purposes.

The topic hierarchy is:

```
stock
    NYSE
        IBM
        Microsoft
        etc.
    FTSE
        HFX
        FRE
        etc.
    etc.
```

Let us assume an administrator wishes to set up ACLs so that a group of people may publish on any topic below NYSE, or a different group on any topic below FTSE, but without permitting anyone to publish on stock/NYSE or stock/FTSE (for example, to avoid excessive unwanted messaging).

With a conventional system, the administrator would have to set PUBLIC: deny/deny/deny on stock, and then for every topic under NYSE, they would have to set NYSEPublishers: allow/x/x.

With non-inheritable ACLs, the administrator can set PUBLIC: deny/deny/deny on stock, NYSEPublishers: allow/x/x on NYSE, and then PUBLIC: deny/deny/deny (non-inherited) on NYSE.

This would also be useful if the administrator wanted to set permissions in a large topic structure, where there are some people with general permissions, and perhaps some modifications at leaf nodes, where it is desirable to prevent publishing on any non-leaf topic. With a conventional system, the leaves would all have to have ACLs, and the root would be set to PUBLIC:deny/deny/deny. With the present invention, a smaller number of ACLs with a limited scope of applicability can be set higher in the tree structure.

The above description of a preferred implementation of the invention involves processing a set of ACLs on the tree branch corresponding to a topic of interest when the matching engine is attempting to identify a match between a received message and one or many registered subscriptions. In alternative implementations, this processing to determine the applicable ACL from the set of ACLs for the branch may be performed once in response to updating the topic tree. A representation of the identified applicable ACL could then be stored in association with each topic within the match space such that the applicable ACL will be immediately identifiable at run time without having to collect and process the set of ACLs for a branch for each received message. In practice, the processing overhead involved in determining an applicable ACL is not highly significant. Firstly, the matching engine traverses a branch of the tree structure as part of the step of identifying matching subscriptions, and so part of the process for determining an applicable ACL is already being performed. Secondly, it is known for message brokers to cache ACL checks so that a repeat of a previous check can be answered with reference to the cache without repeating the processing.

According to a second embodiment of the invention, a range of attribute values can be specified for an access control, corresponding to differing scopes of applicability of an ACL. This gives an administrator who is setting operation permissions in relation to hierarchically organised resources consider flexibility to specify a scope of applicability or "depth of inheritance" of an ACL. The non-inheritable ACL's according to the first embodiment described above are a first example of an ACL with a scope of applicability which differs from the default scope of conventionally-inheritable ACLS ("inheritable by all descendants"). In the case of non-inheritable ACLs, a first attribute value is used to represent their zero depth of inheritance. Conventionally-inheritable ACLs would be represented by a different attribute value. Further attribute values can also be set to represent additional scopes of applicability—such as immediate children only, or a specified number of levels in the hierarchy, or to enable inheritance by descendants but to exclude the current node from the scope of applicability of the ACL.

A first example set of attribute values for controlling the scope of applicability of an ACL are as follows:
depth=-1 means no inheritance;
depth=0 (default) means normal inheritability by all descendants;
depth=1 means only immediate children can inherit from the current node;
depth=n (for n>1) means descendants up to the nth hierarchical level underneath the current node can inherit from the current node;
depth=-2 (or some other arbitrary value) could be used to indicate inheritance to some other desired depth such as depth X-1 where leaf nodes are at depth X; and
depth=-3 (or some other arbitrary value) could be used to indicate that an ACL is to apply to descendants, but excluding the current node.

A process is provided for analyzing these attribute values whenever a set of ACLs associated with a branch of the tree are accumulated and processed to determine the applicable ACL for a topic of interest. This process determines from the specified depth values which ACLs are inheritable by which resources in the hierarchy, and applies inheritance rules and priority rules for determining the prevailing ACL for each resource. The policy of firstly relying on a locally specified ACL, and secondly relying on the closest inheritable ACL, can still be applied—it is merely the inheritance rules and prioritization between ACLs which is altered.

To further assist the administrator, a tool is provided which can display the resources in the tree and their associated ACLs, which facilitates modification of the ACLs, and which can be used to select a resource node in order to check whether a specific principal may perform a specific operation on that resource. Such a tool is described in UK patent application GB 0110825.7. The tool displays the result of the check, together with information on how that decision was reached. This information takes the form of:
Reporting whether the operation would be allowed or denied
Highlighting the relevant branch in the tree.
Displaying all the ACLs on that branch.
Highlighting the prevailing ACL whose policy determines the outcome.
"Lowlighting" other user related ACLs on the branch.

This information will help an administrator to better understand the effect of the ACLs that are defined on the tree and to construct a set of ACLs that meet an organization's security requirements. It could be used for security audits, training or problem determination.

The tool imports the full set of ACLs defined on all topics in a broker and graphically displays the topic tree. The tool operator is able to display the set of ACLs defined on a particular node. The displayed ACL shows a principal name (either an individual user or a group) together with a set of 3 "traffic light" symbols that show whether the principal is allowed (green) or denied (red) the right to publish, subscribe or receive persistent messages on that topic. If the symbol is greyed out, then the ACL does not specify a permission for that operation.

Figure 4:
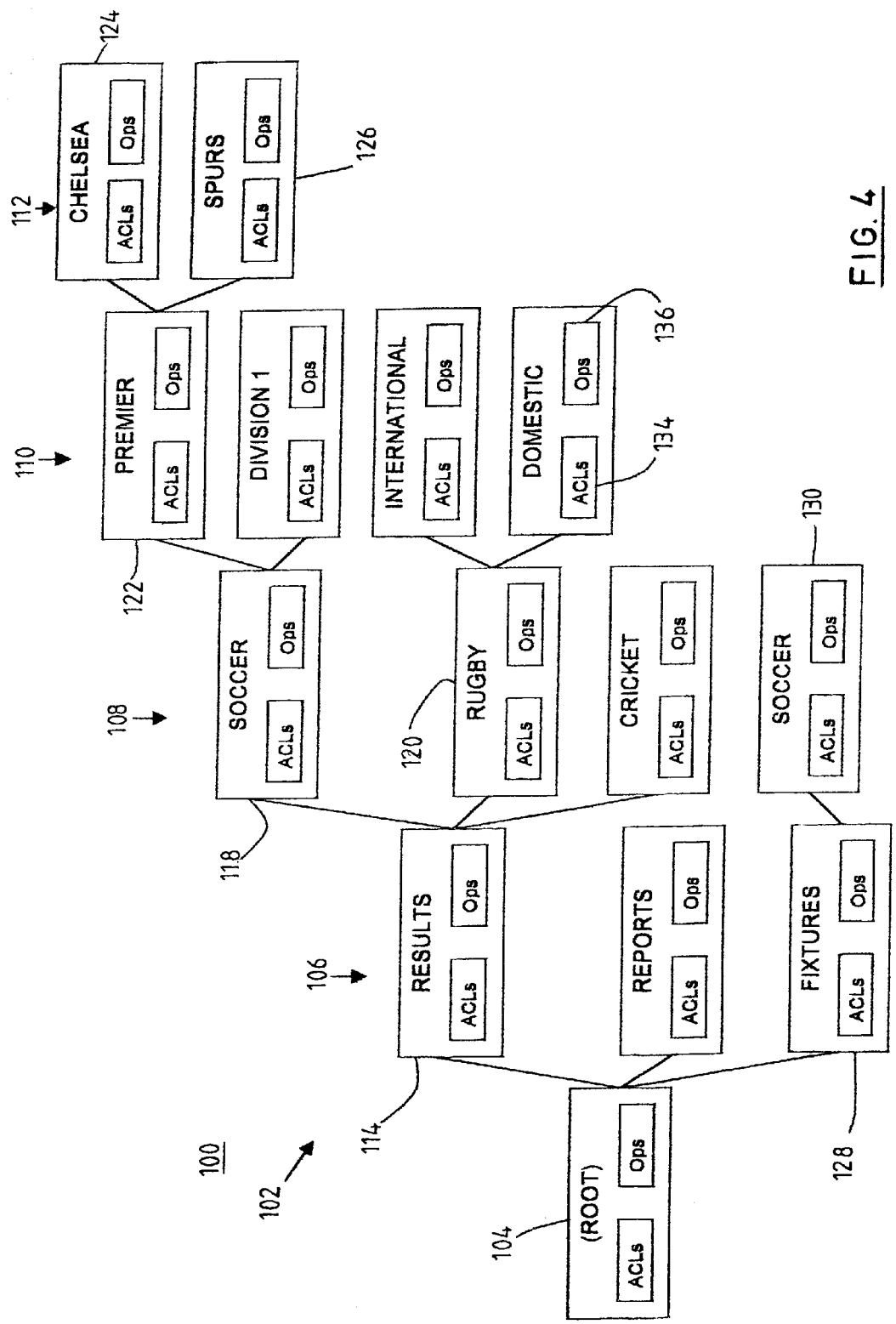
FIG. 4 is a representation of a topic tree structure in a graphical user interface.

FIG. 4 shows a graphical user display 100 displaying a tree structure 102. The tree structure 102 is a horizontal structure in this example and has a root node 104 displayed as a box at the left hand extreme of the tree structure 102. The tree structure 102 has a first level of nodes 106 stemming from the root node 104. In this example there are three nodes in the first level 106. The tree structure 102 shown has a second level of nodes 108, a third level of nodes 110 and a fourth level of nodes 112.

In the first level of nodes 106, a top node 114 leads to three of the nodes of the second level of nodes 108. Of the three nodes of the second level 108, the top two nodes 118, 120 lead to two each of the nodes of the third level 110. The top node 122 of the third level leads to two nodes 124, 126 of the fourth level. In the first level of nodes 106, a bottom node 128 leads to one node 130 in the second level 108.

Each node of the tree structure 102 is displayed graphically as a box with a title which identifies the topic of the node. In this example, the topics relate to sport with the first level 106 including the topics of "Results", "Reports" and "Fixtures". The second level 108 includes the types of sport, for example, "Soccer", "Rugby" and "Cricket". The third level 110 divides the sports into further categories, for example, soccer is divided into "Premier" and "Division 1" leagues and rugby is divided into "International" and "Domestic". The fourth level 112 divides the sport categories into individual clubs, for example, the Premier league of soccer has clubs "Chelsea" and "Spurs". Each box corresponding to a node also includes a selectable "Access Control List" button 134 and an "Operations" button 136 which will be described further below.

When an operator selects the "operations" button on a node he is presented with a dialog that allows him to query the permission of a principal to perform an operation on the topic associated with the node. The query is performed by driving a routine within the message broker which traverses the tree, accumulates related ACLs and determines which is the prevailing ACL according to a set of rules. The result of the query is presented to the user via a GUI.

A tree structure 102 as shown in FIG. 4 has branches leading from the root node 104 to other nodes within the tree structure 102. For example there is a branch represented by the string "Root/Fixtures/Soccer" which includes nodes 104, 128 and 130 or "Root/Results/Rugby" or "Root/Results/Soccer/Premier/Chelsea".

In this example, the tree structure 102 is a topic tree in a message broking system. Each node represents a topic of messages which principals can publish or subscribe to. The full set of Access Control Lists defined for users on all topics in a broker system are imported into the system and displayed by means of the tree structure 102. The Access Control Lists for each topic are displayed by activating the ACL button 134 at a node of interest.

Figure 5:
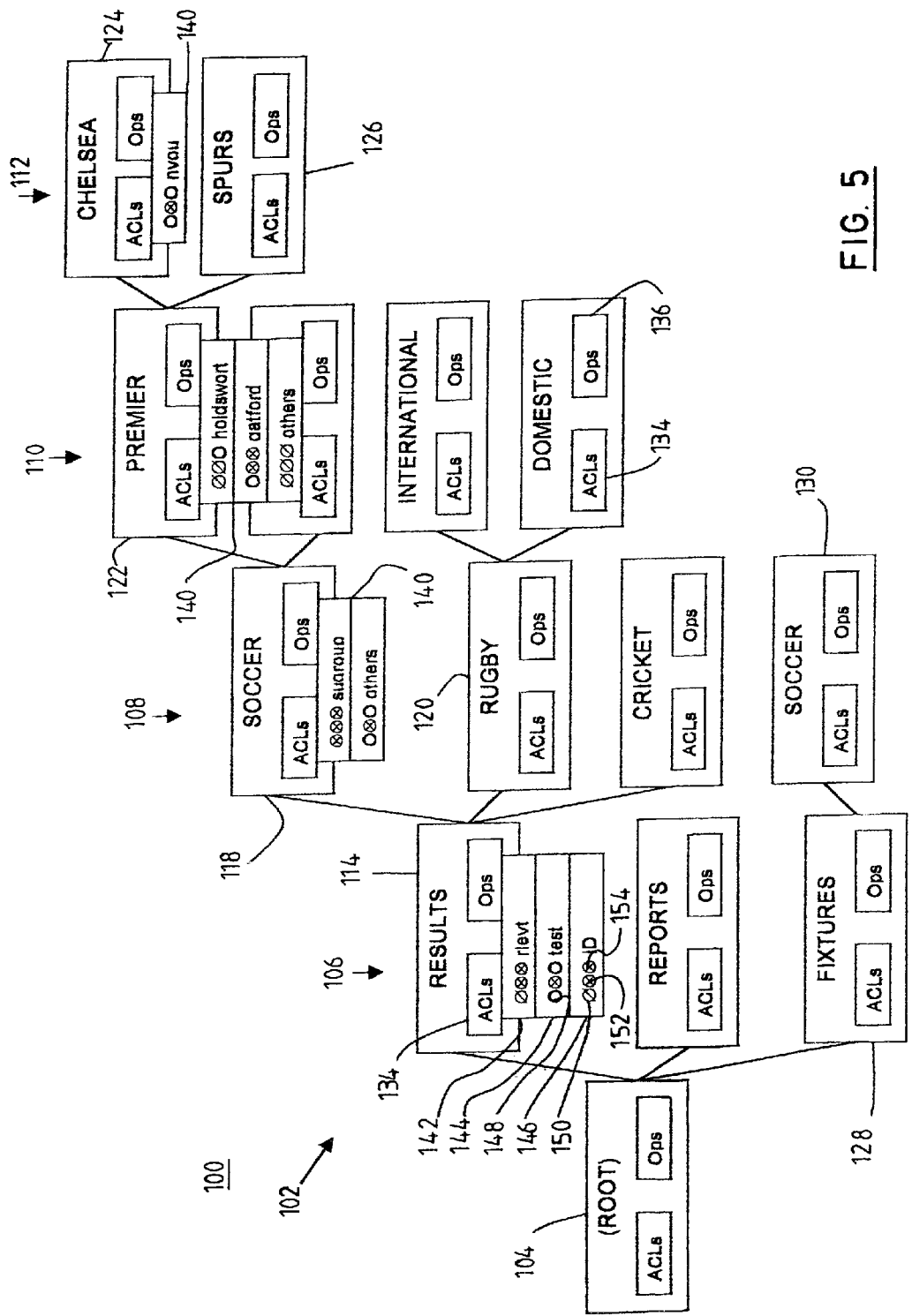
FIG. 5 is a representation of a section of the topic tree structure of FIG. 4 with Access Control Lists defined for particular nodes.

FIG. 5 shows the tree structure 102 of FIG. 4 with the ACL buttons 134 activated for each of the nodes 104, 114, 118, 122 and 124 of the branch "Root/Results/Soccer/Premier/Chelsea".

On activation of the ACL button 134 of a node, for example node 114 with the title "Results", the ACLs defined for that node are displayed in a pop-up box 140. In a typical GUI environment, the activation is achieved by the user clicking the left mouse button while its cursor overlays the ACL button. In node 114, three ACLs are shown in three boxes 142, 144, 146. Each box 142, 144, 146 has a name for the principal, for example "rlevt", "test", "ID". The principal may be an individual user or a group of users which have one ACL for the whole group. Each box 142, 144 and 146 has symbols 148 indicating the status of the access control for that principal.

In this embodiment, the symbols are in the form of three traffic lights 150, 152 and 154 which represent the operations of "publish", "subscribe" and "persistent" as related to a message broking system and as defined above. The symbols 150, 152 and 154 show whether the principal is allowed (indicated, for example, by colour green) or denied (red) the right to publish, subscribe or receive persistent messages on that topic. If the symbol is greyed out, then the ACL does not specify a permission for that operation. In this embodiment, traffic light symbols are used however it will be apparent to a person skilled in the art that other forms of symbols could be used with indications given in ways other than by colour, for example by pattern or symbol shape.

In the node 114, the group "rlevt" is denied the permission to publish messages on the topic of "Results" but is allowed the permission to subscribe persistently to messages. The group "test" has permission to subscribe to messages but no permission is specified for publication or for persistency.

Figure 6:
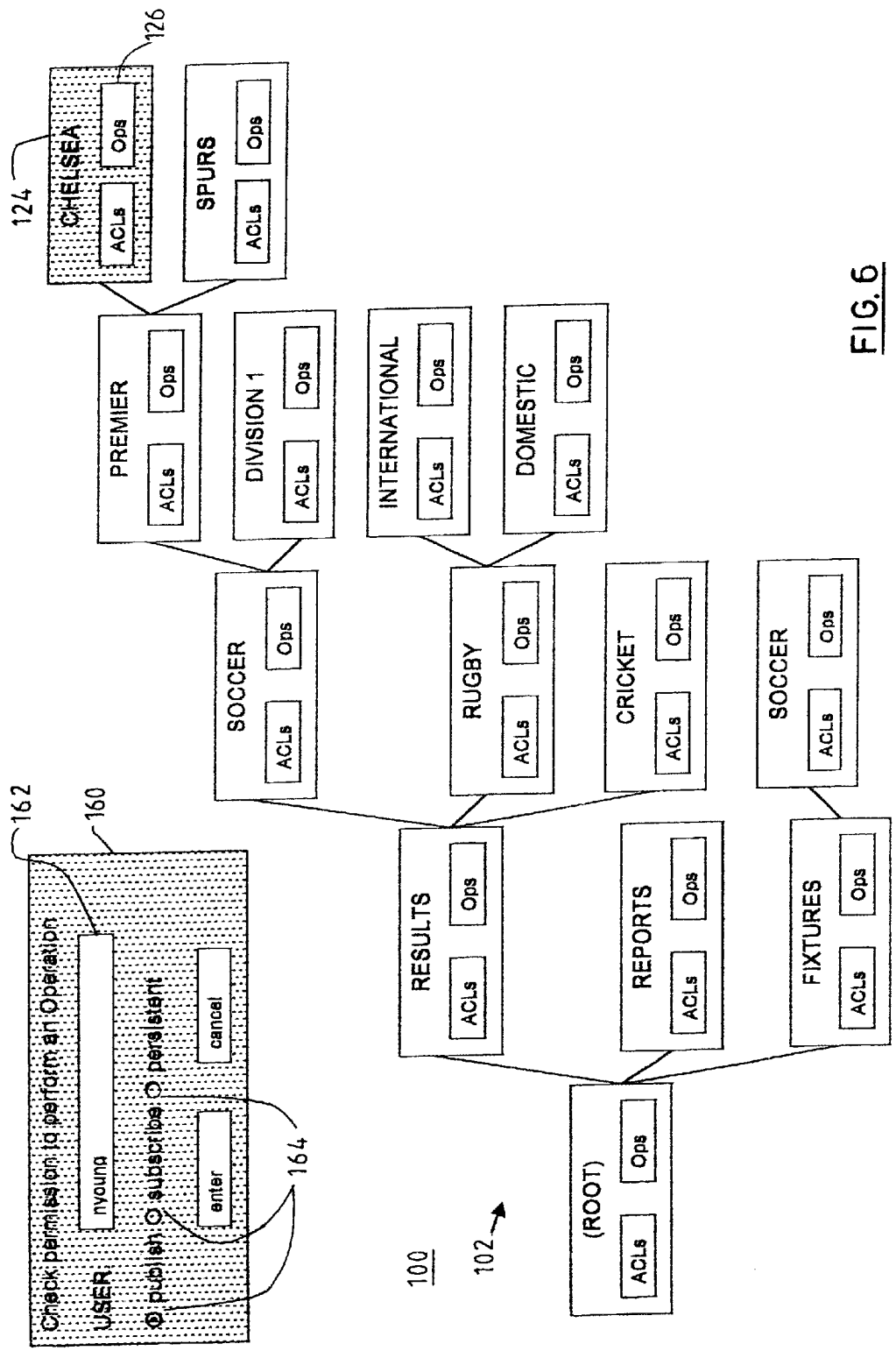
FIG. 6 is a representation of a section of the topic tree structure of FIG. 4 with a dialogue box activated for a particular node of the tree structure.

FIG. 6 shows the tree structure 102 as described with reference to FIG. 4. The Operations button 126 in the node 124 which has the title "Chelsea" has been activated. The activation of the Operations button 126 results in the presentation of a dialog box 160 that allows the permission of a particular user to perform an operation on the topic associated with the node to be queried. The dialog box 160 and the node 124 to which it relates are both highlighted in a given colour or pattern.

The dialog box 160 allows a user to be specified in box 162 and the function to be queried to be chosen by selecting one of the buttons 164 relating to the functions of publish, subscribe and persistent. In FIG. 6, the principal "nyoung" has been specified and the function of publishing has been queried.

Figure 7:
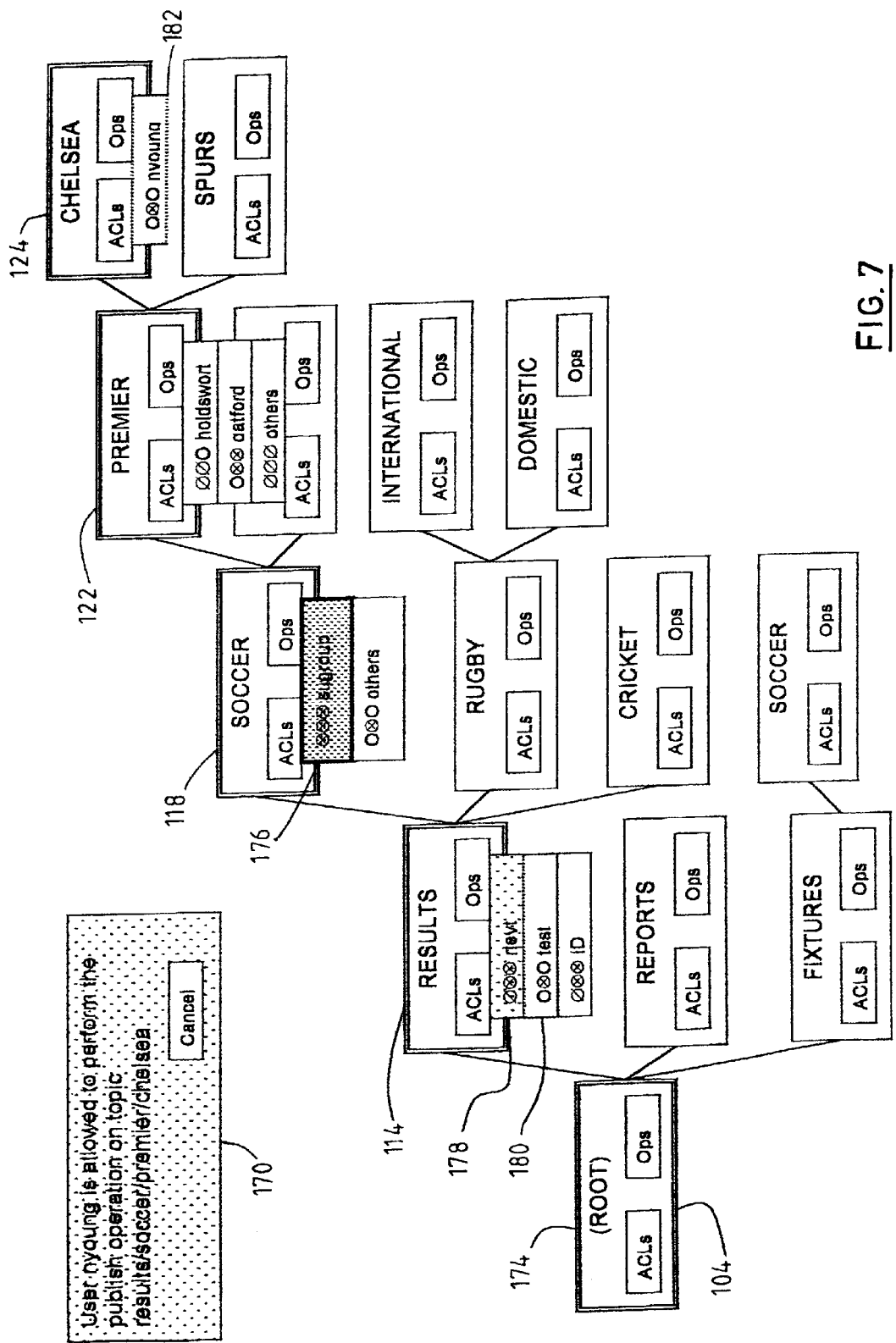
FIG. 7 is a representation of the topic tree structure of FIG. 4 with the permission hierarchy illustrated.

When the dialog box 160 is entered, the system executes a process that traverses the tree 102 accumulating related ACLs, and chooses the prevailing ACL according to a set of predefined rules. The result of the query is presented as shown in FIG. 7.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

The invention claimed is:

1. A method for managing access to data nodes in a hierarchically organized data tree, the method comprising:
applying an override Access Control List (ACL) to a child node in a hierarchically organized data tree, wherein the override ACL overrides, in the child node, an access control of an ancestor node, wherein the hierarchically organized data tree describes files in a distributed computing environment (DCE) file system, wherein the override ACL contains a publish option that specifies whether a principal can publish messages on a topic, a subscribe option that specifies whether a principal can subscribe to messages on the topic, and a persistent option that specifies whether a principal can receive messages persistently, and wherein the override ACL passes the access control to a descendent of the child node; and
assigning priority to and utilizing a user override ACL over a group override ACL, wherein the group override ACL is based on a group to which a user belongs, and wherein the user override ACL is based on an identity of the user, and wherein the child node contains both the group override ACL and the user override ACL for a same user;
graphically displaying on a user interface device an operations button in a node of a graphically displayed hierarchically organized data tree;
in response to the operations button being activated, presenting a dialog box that includes three buttons and a box for entering a user's name, wherein the three buttons are respectively associated with functions for the publish option, the subscribe option, and the persistent option;
receiving a name of the user that has been inputted into the box; and
in response to one of the three buttons being activated, visually displaying a description of an operation, for a chosen option, that is authorized for the user.

2. The method of claim 1, wherein the hierarchically organized data tree describes entries in a lightweight directory access protocol (LDAP).

3. The method of claim 1, wherein the hierarchically organized data tree describes messages used by a message broker for distributing messages to subscriber application programs in accordance with topic-based subscriptions.

4. The method of claim 1, wherein the publish option, the subscribe option and the persistent option are displayed, for a named principal at a node in the hierarchically organized data tree, as same-shaped symbols that are color-coded, wherein a first-colored symbol indicates that an operation is authorized for the named principal, a second-colored symbol indicates that the operation is not authorized for the named principal, and a grayed-out-symbol indicates that an ACL does not specify whether the named principal has permission for the operation.

5. The method of claim 1, wherein the hierarchically organized data tree is visually represented as a displayed tree, and wherein the method further comprises:
highlighting, in the displayed tree, all ACL's whose policies are used to determine a principal's access to a specific node in the displayed tree; and
lowlighting, in the displayed tree, all other ACL's that are not used to determine the principal's access to the specific node in the displayed tree.

6. A computer-readable storage device on which is stored a set of program instructions for controlling a computer, the program instructions being configured for:
applying an override Access Control List (ACL) to a child node in a hierarchically organized data tree, wherein the override ACL applies a parent ACL, which is inherited by the child node from an ancestor node, to the child node and down to a user-defined nth level of descendents of the child node, wherein the hierarchically organized data tree describes messages used by a message broker for distributing messages to subscriber application programs in accordance with topic-based subscriptions, and wherein the override ACL contains a publish option that specifies whether a principal can publish messages on a topic, a subscribe option that specifies whether a principal can subscribe to messages on the topic, and a persistent option that specifics whether a principal can receive messages persistently;

assigning priority to and utilizing a user override ACL, over a group override ACL, wherein the group override ACL is based on a group to which a user belongs, and wherein the user override ACL is based on an identity of the user, and wherein the child node contains both the group override ACL and the user override ACL for a same user;

graphically displaying an operations button in a node of a graphically displayed hierarchically organized data tree;

in response to the operations button being activated, presenting a dialog box that includes three buttons and a box for entering a user's name, wherein the three buttons are respectively associated with functions for the publish option, the subscribe option, and the persistent option;

receiving a name of the user that has been inputted into the box; and in response to one of the three buttons being activated, visually displaying a description of an operation, for a chosen option, that is authorized for the user.

7. The computer-readable storage device of claim 6, wherein the hierarchically organized data tree describes entries in a lightweight directory access protocol (LDAP).

8. The computer-readable storage device of claim 6, wherein the hierarchically organized data tree describes files in a distributed computing environment (DCE) file system.

9. The computer-readable storage device of claim 6, wherein the publish option, the subscribe option and the persistent option are displayed, for a named principal at a node in the hierarchically organized data tree, as same-shaped symbols that are color-coded, wherein a first-colored symbol indicates that an operation is authorized for the named principal, a second-colored symbol indicates that the operation is not authorized for the named principal, and a grayed-out-symbol indicates that an ACL does not specify whether the named principal has permission for the operation.

* * * * *